United States Patent
Li et al.

(10) Patent No.: US 9,483,380 B2
(45) Date of Patent: Nov. 1, 2016

(54) PARAMETERIZED STATES IN SYMBOLIC EXECUTION FOR SOFTWARE TESTING

(71) Applicant: Fujitsu Limited, Kawasaki-shi, Kanagawa (JP)

(72) Inventors: Guodong Li, San Jose, CA (US); Indradeep Ghosh, Cupertino, CA (US)

(73) Assignee: Fujitsu Limited, Kawasaki (JP)

(*) Notice: Subject to any disclaimer, the term of this patent is extended or adjusted under 35 U.S.C. 154(b) by 135 days.

(21) Appl. No.: 14/253,342

(22) Filed: Apr. 15, 2014

(65) Prior Publication Data

US 2015/0293831 A1    Oct. 15, 2015

(51) Int. Cl.
*G06F 9/44* (2006.01)
*G06F 11/36* (2006.01)

(52) U.S. Cl.
CPC .......... *G06F 11/36* (2013.01); *G06F 11/3608* (2013.01); *G06F 11/3676* (2013.01)

(58) Field of Classification Search
CPC ............... G06F 11/3604; G06F 11/36; G06F 11/3608; G06F 11/3676
See application file for complete search history.

(56) References Cited

U.S. PATENT DOCUMENTS

| | | | | |
|---|---|---|---|---|
| 5,513,122 A * | 4/1996 | Cheng | ................... | G06F 17/504 716/103 |
| 5,784,553 A * | 7/1998 | Kolawa | ............... | G06F 11/3676 714/38.1 |
| 5,794,045 A * | 8/1998 | Schell | ................. | G06F 11/3604 714/E11.208 |
| 7,747,985 B2 * | 6/2010 | Campbell | ............... | G06F 11/36 717/127 |
| 8,645,924 B2 | 2/2014 | Li et al. | ........................ | 717/132 |
| 2004/0128104 A1* | 7/2004 | Hirayama | ........... | G06F 11/3676 702/150 |
| 2005/0198597 A1* | 9/2005 | Zhu | ...................... | G06F 11/3608 716/103 |
| 2005/0229044 A1* | 10/2005 | Ball | ..................... | G06F 11/3676 714/38.13 |
| 2007/0033440 A1* | 2/2007 | Tillmann | ............ | G06F 11/3684 714/38.14 |
| 2007/0033443 A1* | 2/2007 | Tillmann | ............ | G06F 11/3684 714/45 |
| 2007/0157180 A1* | 7/2007 | Tillmann | ............ | G06F 11/3672 717/140 |
| 2009/0125294 A1* | 5/2009 | Ganai | ................. | G06F 11/3608 703/22 |

(Continued)

OTHER PUBLICATIONS

Louchka Popova-Zeugmann et al., "Quantitative Evaluation of Time Petri Nets and Applications to Technical and Biochemical Networks", [Online], pp. 1-12, [Retrieved from Internet on Jul. 20, 2016], <http://citeseerx.ist.psu.edu/viewdoc/download?doi=10.1.1.147.361&rep=rep1&type=pdf>.*

(Continued)

*Primary Examiner* — Thuy Dao
*Assistant Examiner* — Ziaul A Chowdhury
(74) *Attorney, Agent, or Firm* — Baker Botts L.L.P.

(57) ABSTRACT

Methods and systems for symbolic execution of software under test include the use of parametric states to losslessly represent a group of concrete execution states. Mathematical abstractions may represent differences between execution states and may define a parametric constraint for a parametric state. The parametric states may be usable for symbolic execution to reduce an amount of memory resources consumed and/or reduce a computational load during symbolic execution. Using parametric states, a larger state space and more program behaviors may be testable using symbolic execution.

16 Claims, 7 Drawing Sheets

(56) References Cited

U.S. PATENT DOCUMENTS

| | | | | |
|---|---|---|---|---|
| 2009/0281999 | A1* | 11/2009 | Sinha | G06F 8/433 |
| 2009/0300423 | A1* | 12/2009 | Ferris | G06F 11/36 714/38.1 |
| 2010/0005454 | A1* | 1/2010 | Sankaranarayanan | G06F 11/3608 717/127 |
| 2010/0083233 | A1* | 4/2010 | Vanoverberghe | G06F 11/3612 717/126 |
| 2011/0320878 | A1* | 12/2011 | Rosu | G06F 11/302 714/38.1 |
| 2012/0179935 | A1* | 7/2012 | Wang | G06F 11/3676 714/32 |
| 2012/0192150 | A1* | 7/2012 | Li | G06F 11/3684 717/118 |
| 2012/0192162 | A1* | 7/2012 | Li | G06F 11/3684 717/141 |
| 2012/0311545 | A1* | 12/2012 | Li | G06F 8/443 717/132 |
| 2013/0055210 | A1* | 2/2013 | Murthy | G06F 11/3608 717/126 |
| 2013/0283236 | A1* | 10/2013 | Kuznetsov | G06F 8/42 717/124 |
| 2014/0082594 | A1* | 3/2014 | Li | G06F 8/436 717/126 |
| 2014/0215445 | A1* | 7/2014 | Chockler | G06F 11/3608 717/132 |

OTHER PUBLICATIONS

Michel Knapik, "Parameter Synthesis for Timed Kripke Structures", [Online], 2014, pp. 1-16, [Retrieved from Internet on Jul. 20, 2016], <http://s3.amazonaws.com/academia.edu.documents/39831775/Parameter_Synthesis_for_Timed_Kripke_Str20151109-29150>.*

A.Zadehgol, "A Semi-Analytic and Cellular Approach to Rational System Characterization through Equivalent Circuits", [Online], 2015, pp. 1-17, [Retrieved from Internet on Jul. 20, 2016], <https://www.researchgate.net/profile/Ata_Zadehgol/publication/283975431>.*

Terry Caelli et al., "Computational approaches to human pattern recognition", {Online], 1994, pp. 57-76, {Retrieved from Internet on Jul. 20, 2016], <https://webdocs.cs.ualberta.ca/~wfb/publications/J-1994-CaelliBischof.pdf>.*

Godefroid, P.; "Compositional Dynamic Test Generation," POPL 2007; Jan. 17-19, 2007, Nice, France; 8 pages.

Cadar, C., et al.; "RWset: Attacking Path Explosion in Constraint-Based Test Generation;" Stanford University; TACFAS 2008; 49 pages.

Hansen, T., et al.; "State Joining and Splitting for the Symbolic Execution of Binaries;" Department of Computer Science and Software Engineering, The University of Melbourne, Vic. 2010, Australia, RV 2009, LNCS 5779; pp. 76-92.

Godefroid, P., et al.; "Compositional May-Must Program Analysis: Unleashing the Power of Alternation;" POPL 2010; Jan. 17-23, 2010, Madrid, Spain; 13 pages.

Kuznetsov, V., et al.; "Efficient State Merging in Symbolic Execution," PLDI 2012; Jun. 11-16, 2012, Beijing, China; 12 pages.

Bugrara, S., et al.; "Redundant State Detection for Dynamic Symbolic Execution;" USENIX Association; 2013 USENEX Annual Technical Conference; pp. 199-211.

* cited by examiner

FIG. 6 ns of an embodiment of an example of
PARAMETERIZED STATES IN SYMBOLIC EXECUTION FOR SOFTWARE TESTING

BACKGROUND

1. Field of the Disclosure

The present disclosure relates to symbolic execution for software testing and, specifically, to parameterized states in symbolic execution.

2. Description of the Related Art

With the ubiquitous presence of software programs permeating many aspects of daily life, software testing by validating and verifying software code to provide robust and reliable executable programs has become an important part of the software development process. Traditionally, software quality has been assured through manual software testing, which may be tedious, difficult, and may often give poor coverage of the software code. More recently, automated techniques for formal software testing have been developed. One such technique is symbolic execution.

Symbolic execution is a non-explicit state model-checking technique that treats input to a software program as symbol variables. Symbolic execution includes creation of complex equations by executing finite paths in the software program with symbolic variables and then solving the complex equations with a solver, typically known as a decision procedure, to obtain error scenarios, if any exist. In contrast to explicit state model checking, symbolic execution may be able to work out possible input values and possible use cases of the possible input values in a software program under analysis. Symbolic execution may be used to automatically generate test inputs with high structural coverage for the software under test. However, during symbolic execution, a very large number of execution paths and/or states may be generated that may limit the applicability of symbolic execution due to high consumption of computational resources.

SUMMARY

In one aspect, a disclosed method for symbolic execution of executable code using parametric states includes identifying shared state elements and different state elements in execution states associated with the executable code. The method may include representing the different state elements using a state abstraction. Based on the state abstraction, the method may include defining a parametric state having a parametric constraint, the parametric state losslessly representing a group of the execution states. An execution state in the group of execution states may be an instance of the parametric state. The method may further include symbolically executing the executable code using a processor having access to memory media, including using the parametric state.

Additional disclosed aspects for symbolic execution of executable code using parametric states may include a non-transitory computer-readable memory media including instructions executable by a processor and a system including a processor having access to memory media.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), widget "12-1" refers to an instance of a widget class, which may be referred to collectively as widgets "12" and any one of which may be referred to generically as a widget "12". In the figures and the description, like numerals are intended to represent like elements.

As used herein, "symbolic execution" refers to methods and operations for software testing that simulates (or emulates) the execution of software under test using symbolic rather than concrete inputs. Symbolic execution may compute the effect of these symbolic inputs in the software under test using symbolic expressions. Symbolic execution may be used to formally test and validate various types of software programs and/or modules. As used herein, an "executor" refers to an execution engine that performs symbolic execution on a "software under test (SUT)". The software under test may be a complete application program or may be one or more selected code modules.

In particular embodiments, symbolic execution characterizes each execution path in the software under test with a path condition that may be defined as a conjunction of boolean expressions. Each boolean expression in the path condition may denote one branching decision made during the symbolic execution of a distinct path of the software under test. When the symbolic execution is finished, multiple path conditions may be generated, each path condition corresponding to a feasible execution path of the program code with respect to the symbolic inputs. The solutions to the path conditions may be used as test inputs so that the software under test is executed along a particular defined execution path. In particular embodiments, a decision procedure, such as a SMT (Satisfiability Modulo Theory) solver, is used to find the solutions to the path conditions and to remove false paths. When such solutions are obtained for actual execution paths in the software under test, then exhaustive testing of the program or module may be possible. In addition, some so-called "sanity properties" may be checked during symbolic execution, such as memory out-of-bound access, divide-by-zero, and certain types of user-defined assertions.

Although symbolic execution may validate the software under test and may achieve greater test coverage of program behaviors than traditional testing approaches, symbolic execution may be computationally intensive and may consume a significant amount of computational resources, such as processor time, memory space, number of processors, etc., which may adversely impact the economic feasibility of symbolic execution. For example, symbolic execution may suffer from a path and/or state explosion problem, in which the software under test may result in a computationally intractable symbolic model for processing by the executor. As a result of the path/state explosion problem, the executor may process a large number of execution paths and associated states and may fail to output a set of useful test cases in a reasonable time. Thus, a too large number of execution paths and associated states may represent a primary bottleneck for symbolic execution, and may limit scalability and/or applicability of symbolic execution to certain software under test, which may be undesirable.

As will be presented herein, the execution states and corresponding paths of a software under test may be represented using a state tree, which may include a number of nodes representing states and a number of edges between the nodes representing path conditions. Each node in the state tree may represent an execution state containing an instruction counter, a path condition, and a value store. Each edge may represent a constraint connecting one node to another.

In U.S. Patent Publication No. 2012/0311545, certain problems associated with excessive execution paths during symbolic execution are addressed with methods and systems for losslessly reducing a number of execution paths and a number of states of a software under test comprising a basic code block absent any intermediate execution jumps or jump targets. As will be described in further detail herein, the inventors of the present disclosure have discovered methods and systems for parameterized state management in symbolic execution that may provide state merging techniques using parameterized methods. The methods and systems for parameterized state management in symbolic execution described herein may be usable to improve resource consumption of symbolic execution and, thus, may result in a faster and more efficient generation of useful test cases using symbolic execution, which may be beneficial for automated software testing. It is noted that the methods and systems described herein may be usable with previous improvements and solutions used in symbolic execution.

As used herein, a parametric state ("pstate") in symbolic execution may define a group of concrete states ("cstate") that are represented using symbolic parameters. In this manner, a pstate may be used to reduce complexity in symbolic execution by avoiding enumeration of individual cstates. A pstate may represent an exact encoding of a full set of enumerated cstates. Pstates may be particularly applicable to loops and switch statements (or case statements) in symbolic execution where iterations and cases are independent of one another.

Figure 1:
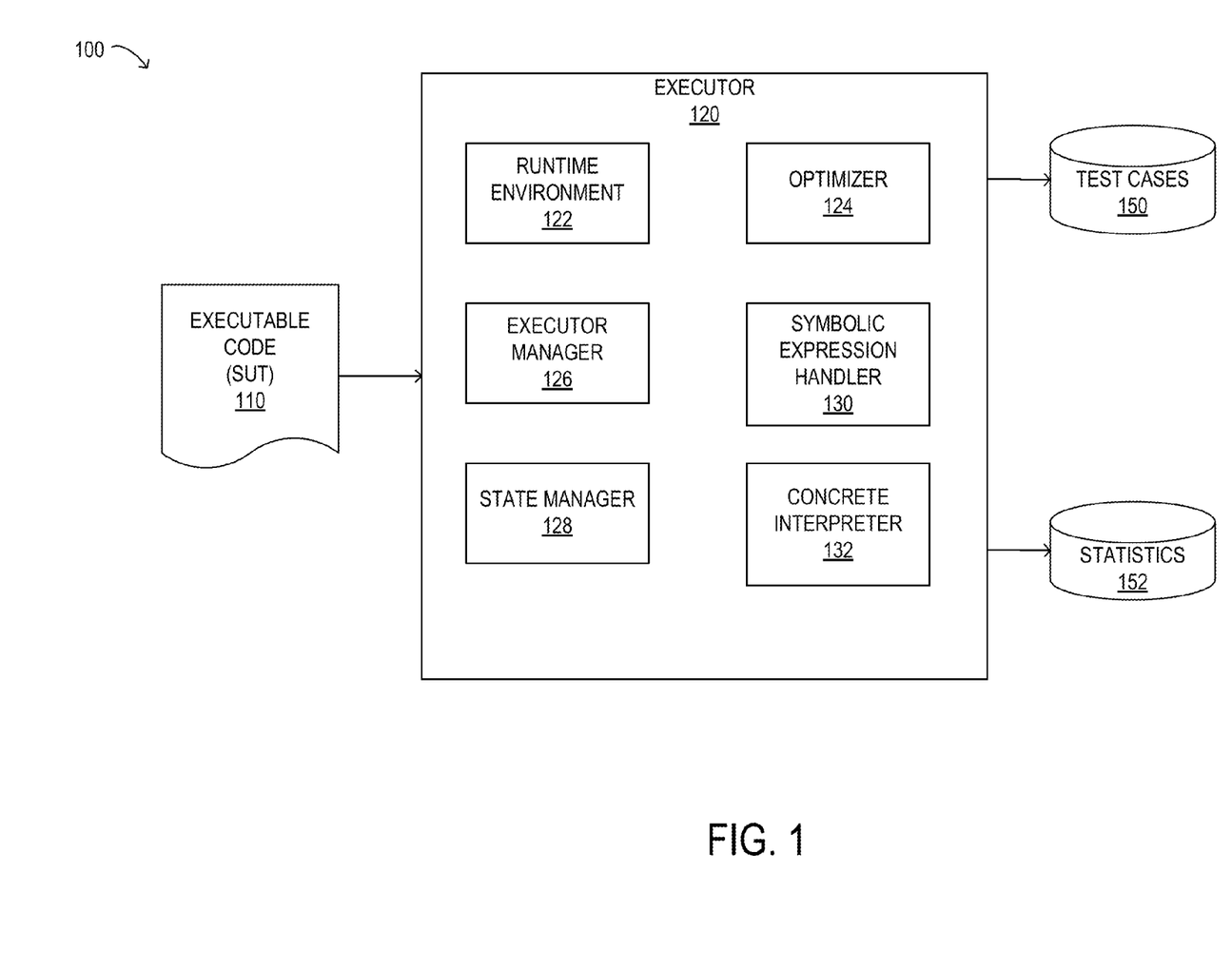
FIG. 1 is a block diagram of selected elements of an embodiment of a symbolic execution system.

Turning now to the drawings, FIG. 1 illustrates a block diagram of selected elements of an embodiment of symbolic execution system 100. As shown, symbolic execution system 100 may represent a collection of tools for performing symbolic execution, as described herein. In certain embodiments, at least certain portions of symbolic execution system 100, such as executor 120, may represent executable code and/or instructions executable by a processor to perform symbolic execution (see also FIG. 5). In FIG. 1, executor 120 may represent an execution engine that performs symbolic execution on executable code (SUT) 110, which represents software under test. It is noted that symbolic execution system 100 may be used for various kinds of executable code (SUT) 110, including executable code in different languages and/or executable code compiled using different types or versions of compilers. As shown in FIG. 1, executor 120 may generate test cases 150 and statistics 152 as output of the symbolic execution. Test cases 150 may represent results of actual executable code that may be used to analyze and evaluate executable code (SUT) 110, for example, for bug checking and/or for other run-time errors. In particular embodiments, symbolic expressions obtained by symbolically executing executable code (SUT) 110 by executor 120 may be solved using, for example, an SMT solver. The solutions, if any, may be used to generate test cases 150 for testing and validating executable code (SUT) 110. Statistics 152 may represent statistical values describing test cases 150, such as statistics for tracking coverage of specific execution paths within executable code (SUT) 110.

As shown in FIG. 1, executor 120 may include runtime environment 122, optimizer 124, executor manager 126, state manager 128, symbolic expression handler 130, and concrete interpreter 130. Runtime environment 122 may be specific to a particular type of programming language or compiler and may enable simulation of runtime execution of executable code (SUT) 110. Optimizer 124 may include functionality to optimize states and/or paths used in symbolic execution. Executor manager 126 may be responsible for managing an execution environment of executor 120. State manager 128 may include functionality for generating and managing instances of states in symbolic execution, including cstates and pstates. Symbolic expression handler 130 may be used to process and solve symbolic expressions in symbolic execution. Concrete interpreter 130 may be used to analyze execution properties of concrete states in symbolic execution.

In operation of symbolic execution system 100, parametric states may be used to represent a set of concrete states without losing information. In other words, a set of concrete states may be losslessly merged into one or more parametric states for symbolic execution. The generation of the parametric states may include determining whether the merging of the cstates is possible, including determining whether the differences among the cstates are suitable for parametric formulation. In certain instances, simplifications and optimizations may be applied to the cstates to enable merging into pstates. Also, from many possible abstraction schemes for defining the pstates, a best abstraction scheme may be determined. Finally, the parameterization of cstates into pstates may be performed in a manner that improves overall computational efficiency of symbolic execution such that the benefits from using a pstate are greater than the costs of parameterization of the pstate.

Figure 2:
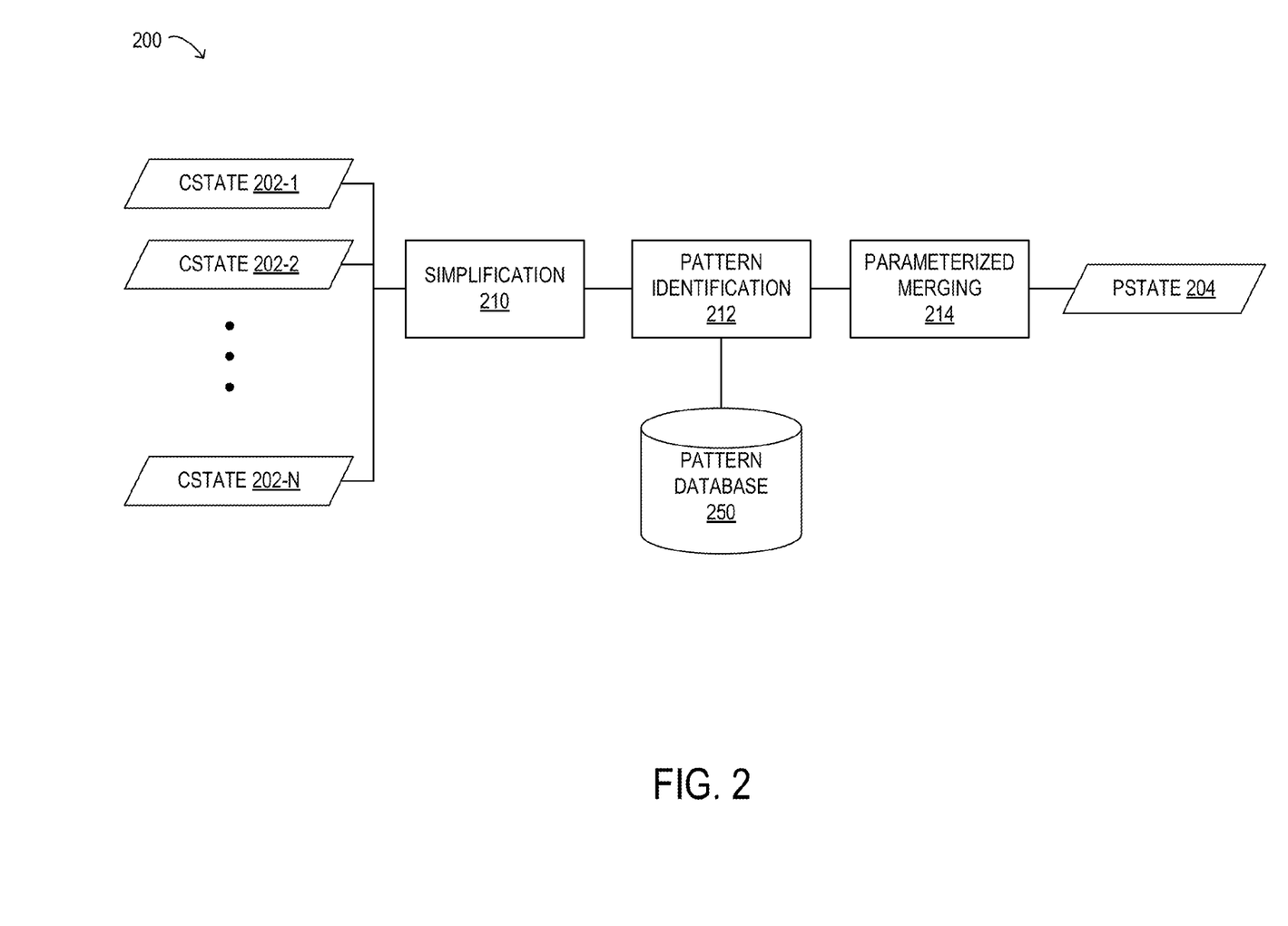
FIG. 2 is a block diagram of selected elements of an embodiment of a parameterization process.

Referring now to FIG. 2, a block diagram of selected elements of an embodiment of parameterization process 200 is depicted. As shown, parameterization process 200 may represent operations and data used for parameterized state merging in symbolic execution, as described herein. In particular embodiments, parameterization process 200 may be performed using symbolic execution system 100 (see FIG. 1), for example, by state manager 128. Specifically, parameterization process 200 may be used to generate pstate 204 representing one or more parameterized states that fully describe a set of cstates 202.

In conventional symbolic execution, a concrete execution state (i.e., a cstate) may include an instruction pointer value (IP), a path condition (PC), and a value store (not shown in the drawings). The IP may mark a current execution point during symbolic execution. It will be assumed herein that two cstates are merged into a pstate only when they have the same IP. The PC may represent a set of symbolic constraints that an execution state satisfies. The value store may map addresses to values, which can be concrete or symbolic values. A parametric state or pstate may represent a group of cstates having shared patterns. The differences in the group of cstates that may be combined into a pstate may be described using a symbolic formula. The differences in the group of cstates used to form a pstate may be differences in path conditions and/or differences in symbolic values. Accordingly, a pstate produced by parametric state merging, as described herein, may include an additional portion, namely a parametric constraint ("pconstraint"), which is a symbolic boolean formula that refers to the characteristics of the group of cstates. In other words, the pconstraint summarizes the differences in the group of cstates that are used to form a pstate. Thus, a cstate may be viewed as an instance of a corresponding pstate, while a pstate may completely describe all associated cstates. From the perspective of the executor, after parameterized state merging, a given pstate may behave exactly the same as each cstate in the group of cstates.

In FIG. 2, parameterization process 200 describes operations in a particular embodiment of parameterized state merging of cstates 202 into pstate 204. Cstates 202 are represented by a set of N number of cstates 202, shown as cstate 202-1, cstate 202-2, and so on, up to cstate 202-N. Cstates 202 may be received by simplification 210, which may analyze cstates 202 to determine opportunities for expression simplification and normalization. In one embodiment, simplification 210 may attempt to match at least certain portions of state trees for cstates 202 to ascertain whether the differences may be abstracted into a generalized and simplified form. Simplification 210 may employ symbolic reasoning to solve and simplify expressions associated with cstates 202. Then pattern identification 212 may access pattern database 250 to search for patterns in expressions associated with cstates 202 after simplification 210. In some embodiment, pattern identification 212 may attempt to find invariants among PCs and value stores of cstates 202 that may indicate possibilities for state merging. Pattern database 250 may represent a knowledge store of common invariant patterns that are accessible for matching by pattern identification 212. After pattern identification 212, parameterized merging 214 may then use the patterns identified by pattern identification 212 and/or known state abstraction schemes (not shown) to generate pstate 204, which may represent one or more execution states representing all cstates 202 for purposes related to symbolic execution.

Figure 3:
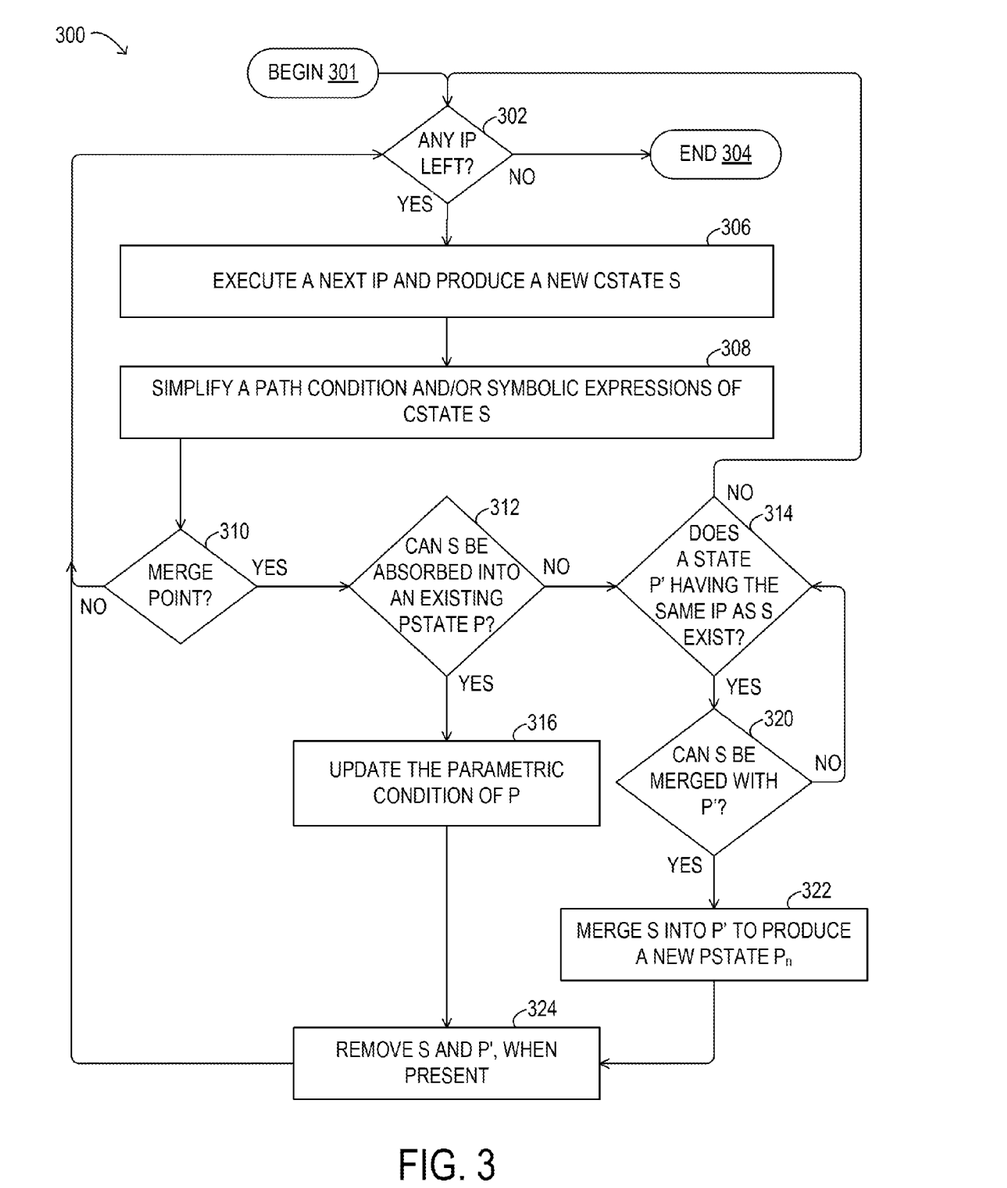
FIG. 3 is a flow chart depicting selected elements of an embodiment of a method for parameterized state merging.

Turning now to FIG. 3, a block diagram of selected elements of an embodiment of method 300 for parameterized state merging is depicted in flow-chart form. Method 300 may be performed by executor 120 to implement parameterization process 200 (see FIGS. 1 and 2). It is noted that certain operations described in method 300 may be optional or may be rearranged in different embodiments.

Method 300 may begin (operation 301) with a decision whether any instruction pointers (IP) are left for execution (operation 302). The IP in operation 302 may represent instructions associated with a software under test using symbolic execution. When the result of operation 302 is NO, method 300 may end (operation 304). When the result of operation 302 is YES, a next IP may be executed and produce (operation 306) a new cstate S. A path condition (PC) and/or symbolic expressions of cstate S may be simplified (operation 308). Operation 308 may include normalization of expressions in cstate S. Then, a decision may be made whether a merge point has been reached (operation 310) When the result of operation 310 is NO, method 300 may return to operation 302. When the result of operation 310 is YES, a decision may be made whether cstate S can be absorbed into an existing pstate P (operation 312). Pstate P may absorb cstate S when pstate P is extendable to accommodate cstate S by extending P's parametric condition. When the result of operation 312 is YES, the parametric condition of pstate P may be updated (operation 316). When the result of operation 312 is NO, a decision may be made whether a state P' exists having the same IP as cstate S (operation 314). The state P' may be a cstate or a pstate. When the result of operation 314 is NO, method 300 may return to operation 302. When the result of operation 314 is YES, a decision may be made whether cstate S can be merged with P' (operation 320). The condition in operation 320 may be satisfied when PCs of cstate S and state P' may be abstracted to a common PC, and when variables in cstate S and state P' may be abstracted into a common variable or described with logical evaluations, such as if-then-else statements. When the result of operation 320 is NO, method 300 may return to operation 314. When the result of operation 320 is YES, cstate S and state P' are merged to produce a new parametric state $P_n$. (operation 322). In certain embodiments, state P' may be reused for the new parametric state $P_n$. Upon merging in operation 322, the new parametric state $P_n$ may include an abstraction of cstate S. After operation 322 and after operation 316, cstate S and state P, when present, may be removed (operation 324). After operation 324, method 300 may return to operation 302.

A first example of parametric state merging will now be described in further detail. In the first example, consider the following Expressions 1 and 2 that may appear as cstates in a software under test:

$$2a+b+c+1 \qquad \text{Expression 1}$$

$$3+b+c+6a \qquad \text{Expression 2}$$

In a first method, common patterns and/or subpatterns may result in identification of a pconstraint for Expressions 1 and 2. For example, using expression simplification and normalization, differences in the expressions may be identified and evaluated for possible abstraction. For example, Expression 2 may be normalized according to variable order to result in Expression 3.

$$6a+b+c+3 \qquad \text{Expression 3}$$

The differences between Expressions 1 and 3 may now be identified as the terms 2a, 6a and 1, 3. From these differences, a symbolic variable i may be introduced where i has values of (1, 3) to obtain the abstraction in Expression 4, which may represent the pconstraint for a pstate that includes both original Expressions 1 and 2.

$$(2i*a)+b+c+i \qquad \text{Expression 4}$$

An expression may be absorbed into another expression by augmenting a variable value domain. For example, the following Expression 5 is an instance of Expression 4 for i=5, showing that the abstraction format in Expression 4 may also absorb Expression 5.

$$10a+b+c+5 \qquad \text{Expression 5}$$

Instead of the first method in the first example, a second method to obtain Expression 4 may involve using an invariant tool and refining to constrain possible values of i. Instead of the first method and/or the second method in the first example, a third method may involve using a pattern library to compare Expressions 1 and 2 with common invariant patterns, such as first order polynomials, to match with Expression 4.

Turning now to FIGS. 4A, 4B, 4C, and 4D, selected elements of embodiments of a second example of parametric state merging are shown as respective state trees 400, 401,

402, and 403. The second example illustrated in FIGS. 4A-D is based on symbolic execution of the following executable code under test, in which the symbolic inputs are the variables: n, a, and b. In FIGS. 4A-D, state trees for the symbolic execution are illustrated to show an execution state after a complete iteration of the executable code under test for values of n from 1 to 1000.

```
int k = 0, v = 0;
for (int i = 1; i <= 1000; i++) {
    if (i == n) {
        if (k > f (i * b)) v = a + i * b;
    }
    k += 2;
}
assert(v + k != 500);
```

Executable Code Under Test for the Second Example.

Figures 4A, 4B:
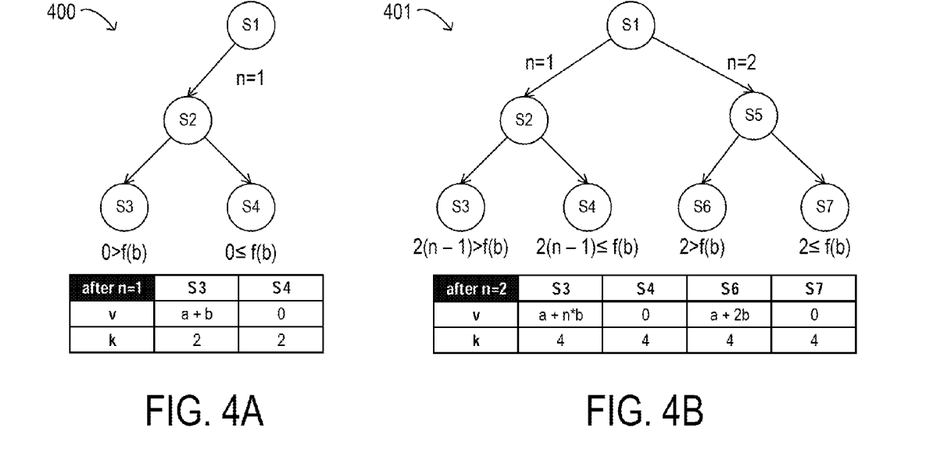
FIGS. 4A, 4B, 4C, and 4D are control flow graphs of selected elements of an embodiment of an example of parameterized state merging.

In FIG. 4A, state tree 400 represents completed execution states when a first iteration of the for-loop is complete. State S1 may represent the initial code int k=0, v=0, while state S2 may represent the first for-loop entry when the condition "i==n" specifies that the path condition is n=1. The case with the condition "i≠n" is not shown. States S3 and S4 may represent the two possibilities of the conditional if-statement code. Thus, after the completed execution state for n=1, for state S3, 0>f(b), v=a+b and k=2, while for state S4, 0≤f(b), v=0 and k=2. Because this is the first iteration of the symbolic execution, no pconstraints have yet been identified and no pstates exist yet.

In FIG. 4B, state tree 401 represents completed execution states when the second iteration of the for-loop is complete, where the states for n=2 are produced. State S1 may represent the initial code int k=0, v=0, while states S2 and S5 may represent the for-loop entry code respectively for n=1 and n=2. States S3 and S4 may represent the two possibilities of the conditional if-statement code for n=1. When S3 and S4 execute the second loop iteration with n=2, since condition "2==n" conflicts with "n=1", states S3 and S4 skip executing the if-statement, and increase variable k's value by 2 to be 4. Similarly, states S6 and S7 may represent the two possibilities of the conditional if-statement code for n=2. Thus, after the completed execution state for n=2, for state S6, 2>f(b), v=a+2b and k=4, while for state S7, 2≤f(b), v=0 and k=4. At this time, state S6 is not an instance of any existing pstate, but does share the same IP as states S3 and S4. Thus, states S3 and S6 may be abstracted to 2(n−1)>f(b) with v=a+n*b. State S3 may be reused for the parametric state, and state S6 may be removed. At this time, state S7 is not an instance of any existing pstate, but does share the same IP as states S3 and S4. Thus, states S4 and S7 may be abstracted to 2(n−1)≤f(b) with v=0. State S4 may be reused for the parametric state, and state S7 may be removed. State S5 may also be removed when states S6 and S7 are removed since state S2 corresponds to state S5.

Figure 4C:
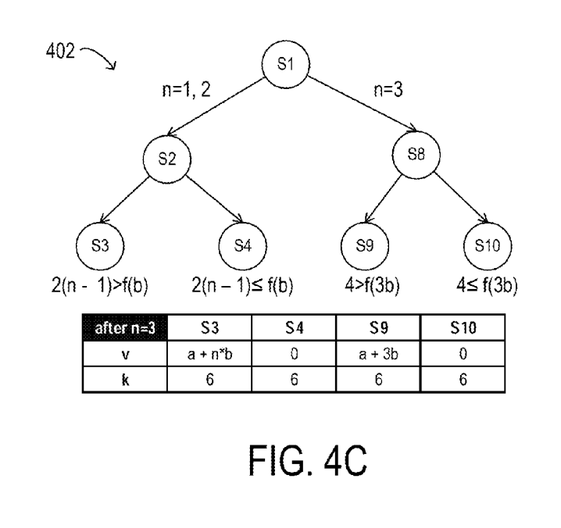

In FIG. 4C, state tree 402 represents completed execution states when the third iteration of the for-loop is complete, where the states for n=3 are produced. State S1 may represent the initial code int k=0, v=0, while states S2 and S8 may represent the for-loop entry code respectively for n=1, 2 and n=3. States S3 and S4 may now represent two pstates for n∈[1,2], and states S9 and S10 may represent the two possibilities of the conditional if-statement code for n=3. Thus, after the completed execution state for n=3, for state S9, 4>f(3b), v=a+3b and k=6, while for state S10, 4≤f(3b), v=0 and k=6. At this time, state S9 is an instance of pstate S3 and state S10 is an instance of pstate S4. Thus, pstates S3 and S4 may absorb states S9 and S10 respectively and states S8, S9, and S10 may be removed.

Figure 4D:
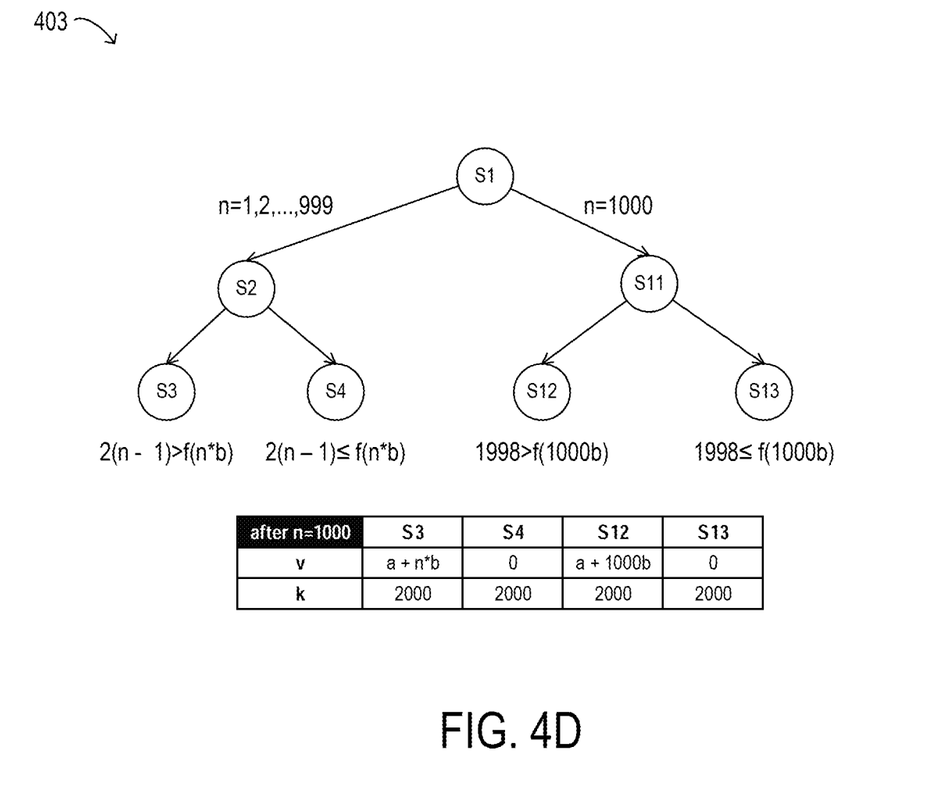

In FIG. 4D, state tree 403 represents completed execution states when the 1000$^{th}$ iteration of the for-loop is complete, where the states for n=1000 are produced. State S1 may represent the initial code int k=0, v=0, while states S2 and S11 may represent the for-loop entry code respectively for n=1, 2 . . . , 999 and n=1000. States S3 and S4 may now represent two pstates for n∈[1,999], and states S12 and S13 may represent the two possibilities of the conditional if-statement code for n=1000. Thus, after the completed execution state for n=1000, for state S12, 1998>f(1000b), v=a+1000b and k=2000, while for state S13, 1998≤f(1000b), v=0 and k=2000. At this time, state S12 is an instance of pstate S3 and state S13 is an instance of pstate S4. Thus, pstates S3 and S4 may absorb states S12 and S13 respectively and states S11, S12, and S13 may be removed.

Although iterations for certain values of n have been omitted from the second example in FIGS. 4A-D, it will be evident that in FIG. 4D, pstates S3 and S4 now represent pstates for n ∈ [1,1000] without any loss of information. After merging into pstates S3 and S4, the assertion in the SUT may be checked accurately using the two pstates S3 and S4 rather than iterating through the original 2000 cstates, resulting in a substantial reduction of the computational cost for bug finding, as well as reducing the number of generated tests. Thus, in the second example, 2000 cstates have been replaced with 2 pstates, resulting in a substantial reduction of states for symbolic execution, with a corresponding reduction in computational resource consumption associated with the symbolic execution, the computational resource consumption including a memory consumption and/or a computational load of a processor performing the symbolic execution.

As shown in the second example above, parametric state merging, as described herein, may be particularly effective for loop structures during symbolic execution. The iterations of a loop may often exhibit similar behavior and may differ mainly in how the loop index is used. This behavior may be used to define pconstraints, for example, in the loop header, while common patterns, including PCs and value stores, may be identified in the loop body.

In various embodiments, SUT including the following loop structure may be investigated statically to infer pconstraints and common patterns. The two loop headers imply that a pconstraint candidate is i∈[k1, . . . ]∧j∈[i, . . . ] for symbolic values i and j. The loop body implies that the parametric path condition is c(i,j) and the parametric value of v is f(i,j).

```
for (int i = k1; ...) {
    ...
    for (int j = i, ...) {
        ...
        if (c(i,j)) {
            v = f(i,j);
            ...
        }
    }
}
```

Executable Loop Structure for Inferring Parametric Patterns.

Figure 5:
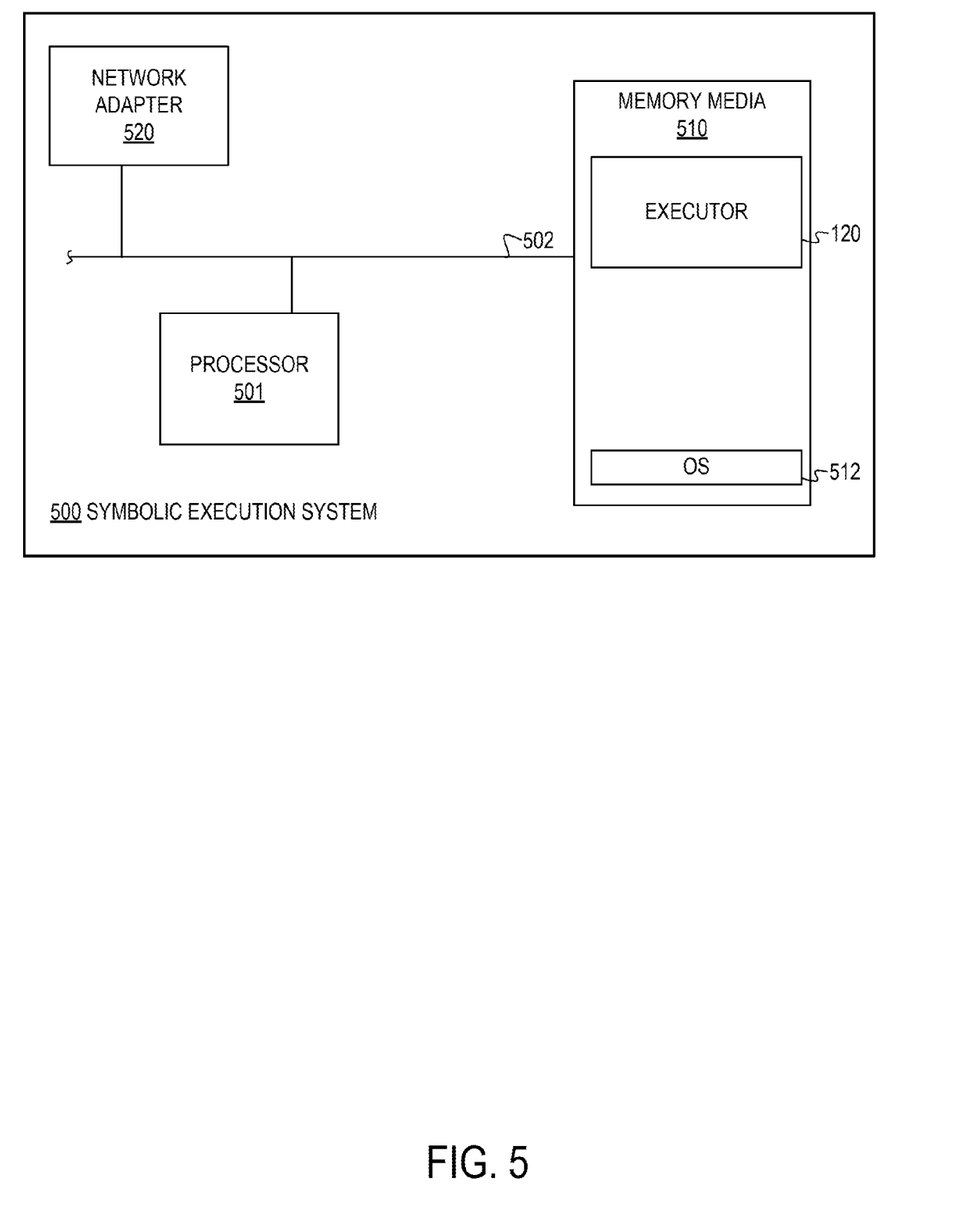
FIG. 5 is a block diagram of selected elements of an embodiment of a symbolic execution system.

Referring now to FIG. 5, a block diagram showing selected elements of an embodiment of symbolic execution system 500 is illustrated. As depicted in FIG. 5, symbolic execution system 500 includes processor 501 and memory media 510, which may communicate using system bus 502.

Also shown accessible via system bus 502 is network adapter 520 that may provide connectivity to a network.

As shown in FIG. 5, memory media 510 may represent volatile, non-volatile, fixed, and/or removable media, and may be implemented using magnetic and/or semiconductor memory. Memory media 510 is capable of storing instructions and/or data. As shown, memory media 510 stores instructions (e.g., code executable by processor 501, such as a computer processor or microprocessor) including operating system (OS) 512, and executor 120 (see FIG. 1). Operating system 512 may be any of a variety of operating systems, such as a UNIX variant, LINUX, a Microsoft Windows® operating system, or a different operating system. As noted previously, executor 120 may include state manager 128, which may provide functionality for generating and managing instances of states in symbolic execution, including cstates and pstates, as described herein.

Figure 6:
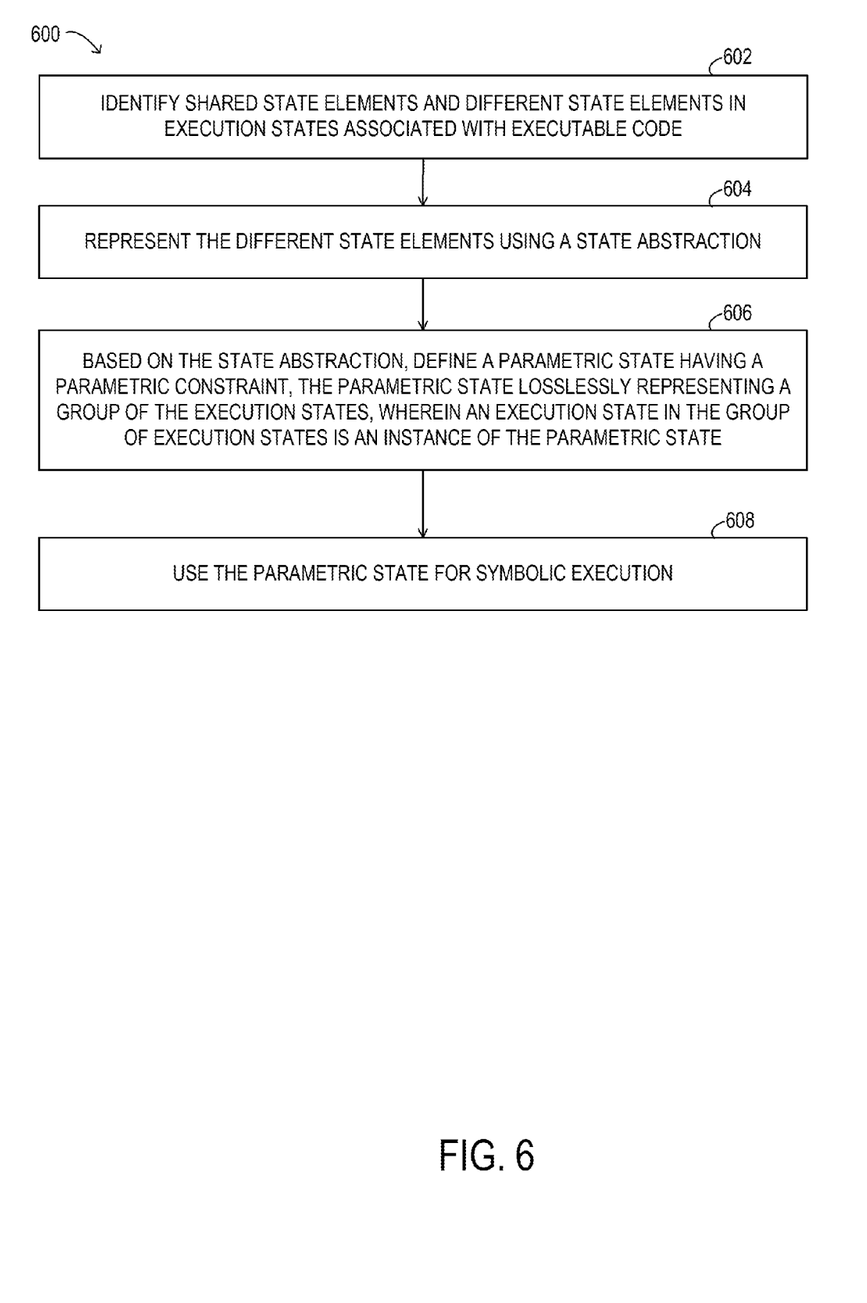
FIG. 6 is a flow chart depicting selected elements of an embodiment of a method for symbolic execution using parameterized states.

Turning now to FIG. 6, a block diagram of selected elements of an embodiment of method 600 for symbolic execution using parameterized states is depicted in flow chart form. Method 600 may be performed by executor 120 to implement parameterization process 200 (see FIGS. 1 and 2). It is noted that certain operations described in method 600 may be optional or may be rearranged in different embodiments.

Method 600 may begin by identifying (operation 602) shared state elements and different state elements in execution states associated with the executable code. The different state elements may be represented (operation 604) using a state abstraction. The state abstraction may be selected to minimize a complexity of the parametric state. Operation 604 may include mathematically simplifying at least some of the different state elements, and identifying common patterns in the different state elements. The identified common patterns may be matched with stored common patterns. Based on the state abstraction, method 300 may include defining (operation 606) a parametric state having a parametric constraint, the parametric state losslessly representing a group of the execution states. Operation 606 may include defining the parametric state based on the common patterns. An execution state in the group of execution states may be an instance of the parametric state. The parametric state may be used (operation 608) for symbolic execution. Operation 608 may include producing test cases using the parametric state, and using the test cases, performing bug checking on the group of states.

In certain embodiments, the group of execution states represents iterations of a loop and method 600 includes defining the parametric constraint based on a loop header of the loop, and defining a path condition and a value store of the parametric state from a loop body of the loop (not shown in FIG. 6). In various embodiments, method 600 includes replacing the group of execution states with the parametric state to reduce a number of the execution states associated with the executable code (not shown in FIG. 6), which may include reducing memory resources consumed by the symbolic execution.

As disclosed herein, methods and systems for symbolic execution of software under test include the use of parametric states to losslessly represent a group of concrete execution states. Mathematical abstractions may represent differences between execution states and may define a parametric constraint for a parametric state. The parametric states may be usable for symbolic execution to reduce an amount on computational resources. Using parametric states, a larger state space and more program behaviors may be testable using symbolic execution.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A computer-implemented method for symbolic execution of executable code using parametric states, comprising:
   identifying shared state elements and different state elements in execution states associated with the executable code;
   representing the different state elements using a state abstraction, the representing including:
      simplifying at least some of the different state elements;
      identifying common patterns in the different state elements;
      matching the identified common patterns with stored common patterns;
   based on the state abstraction, defining a parametric state having a parametric constraint, the parametric state defining a group of concrete states that are represented using symbolic parameters and losslessly representing a group of the execution states, wherein an execution state in the group of execution states is an instance of the parametric state; and
   symbolically executing the executable code using a processor having access to memory media, including using the parametric state.

2. The method of claim 1, wherein defining the parametric state includes:
   defining the parametric state based on the identified common patterns.

3. The method of claim 1, wherein the group of execution states represents iterations of a loop, further comprising:
   defining a path condition and a value store of the parametric state from a loop body of the loop, wherein defining the parametric state includes defining the parametric constraint further based on a loop header of the loop.

4. The method of claim 1, wherein symbolically executing the executable code using a processor having access to memory media, including using the parametric state, further comprises:
   producing test cases using the parametric state; and
   using the test cases, performing bug checking on the group of states.

5. The method of claim 1, further comprising:
   replacing the group of execution states with the parametric state to reduce a number of the execution states associated with the executable code.

6. The method of claim 5, wherein replacing the group of execution states with the parametric state results in a reduction of memory resources consumed by the symbolic execution.

7. The method of claim 1, wherein the state abstraction is selected to minimize a complexity of the parametric state.

8. One or more non-transitory computer-readable media storing processor-executable instructions for symbolic execution of executable code using parametric states, the instructions, when executed by a processor, for causing the processor to:
   identify shared state elements and different state elements in execution states associated with the executable code;

represent the different state elements using a state abstraction;

based on the state abstraction, define a parametric state having a parametric constraint, the parametric state defining a group of concrete states that are represented using symbolic parameters and losslessly representing a group of the execution states, wherein an execution state in the group of execution states is an instance of the parametric state; and use the parametric state for symbolic execution, wherein the instructions to represent include instructions to:
simplify at least some of the different state elements;
identify common patterns in the different state elements;
match the identified common patterns with stored common patterns.

9. The one or more computer-readable media of claim 8, wherein the instructions to define the parametric state include instructions to:
define the parametric state based on the identified common patterns.

10. The one or more computer-readable media of claim 8, wherein the group of execution states represents iterations of a loop, further comprising instructions to:
define a path condition and a value store of the parametric state from a loop body of the loop,
wherein the instructions to define the parametric state include instructions to define the parametric constraint further based on a loop header of the loop.

11. The one or more computer-readable media of claim 8, wherein the instructions to use the parametric state for symbolic execution, further comprise instructions to:
produce test cases using the parametric state; and
using the test cases, perform bug checking on the group of states.

12. The one or more computer-readable media of claim 8, further comprising instructions to:
replace the group of execution states with the parametric state to reduce a number of the execution states associated with the executable code.

13. The one or more computer-readable media of claim 12, wherein the instructions to replace the group of execution states with the parametric state, when executed, result in a reduction of memory resources consumed by the symbolic execution.

14. The one or more computer-readable media of claim 12, wherein the instructions to replace the group of execution states with the parametric state, when executed, result in a reduction of a computational load of the processor for the symbolic execution.

15. The one or more computer-readable media of claim 8, wherein the state abstraction is selected to minimize a complexity of the parametric state.

16. The one or more computer-readable media of claim 8, wherein the instructions to represent further comprise instructions to determine whether a concrete state may be absorbed into a parametric state.

* * * * *